United States Patent
Goto et al.

(10) Patent No.: US 7,038,436 B2
(45) Date of Patent: May 2, 2006

(54) SWITCHING TYPE DC-DC CONVERTER FOR GENERATING A CONSTANT OUTPUT VOLTAGE

(75) Inventors: Daisuke Goto, Kyoto (JP); Hiroaki Ando, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/871,822

(22) Filed: Jun. 18, 2004

(65) Prior Publication Data

US 2004/0263139 A1 Dec. 30, 2004

(30) Foreign Application Priority Data

Jun. 24, 2003 (JP) ............... 2003-179469

(51) Int. Cl.
*G05F 1/44* (2006.01)
*G05F 1/56* (2006.01)

(52) U.S. Cl. .............. 323/282; 323/285; 323/277

(58) Field of Classification Search .......... 323/282, 323/284, 277, 274, 285
See application file for complete search history.

(56) References Cited

U.S. PATENT DOCUMENTS

| | | | |
|---|---|---|---|
| 6,198,258 B1 * | 3/2001 | Ando et al. | 323/222 |
| 6,304,066 B1 * | 10/2001 | Wilcox et al. | 323/282 |
| 6,448,752 B1 * | 9/2002 | Umemoto | 323/288 |
| 6,492,794 B1 * | 12/2002 | Hwang | 323/285 |
| 6,531,854 B1 * | 3/2003 | Hwang | 323/285 |
| 6,580,258 B1 * | 6/2003 | Wilcox et al. | 323/282 |
| 6,611,439 B1 * | 8/2003 | Yang et al. | 363/41 |
| 6,813,170 B1 * | 11/2004 | Yang | 363/56.09 |
| 6,828,762 B1 * | 12/2004 | Brkovic | 323/222 |

FOREIGN PATENT DOCUMENTS

| | | |
|---|---|---|
| JP | 63-164382 | 10/1988 |
| JP | 02-237463 | 9/1990 |
| JP | 06-269160 | 9/1994 |
| JP | 2000-209850 | 7/2000 |
| JP | 2000-245142 | 9/2000 |
| JP | 2002-304225 | 10/2002 |
| JP | 2002-010627 | 11/2002 |

* cited by examiner

*Primary Examiner*—Bao Q. Vu
(74) *Attorney, Agent, or Firm*—Hogan & Hartson LLP

(57) ABSTRACT

An inventive switching type dc-dc converter is adapted to set a protective reference current level lower for a decreased output voltage, and stop the switching control signal supplied to a switching transistor circuit when the detected current level exceeds the protective reference current level. In addition, in case where the output voltage declines due to, for example, a circuit failure such as short-circuiting, the switching period of the switching transistor circuit is extended. Thus, the switching type dc-dc converter is provided with a fold-back current limiting type protection characteristic through reduction of the protective reference current level and extension of the switching period of cycle.

18 Claims, 5 Drawing Sheets

SWITCHING TYPE DC-DC CONVERTER FOR GENERATING A CONSTANT OUTPUT VOLTAGE

FIELD OF THE INVENTION

This invention relates to a switching type dc-dc converter (hereinafter referred to as dc-dc converter) for generating a constant output voltage in a controlled manner, the dc-dc converter equipped with an over-current protection function.

BACKGROUND OF THE INVENTION

There have been known many dc power supply units for providing a constant dc voltage by converting an inputted dc voltage, equipped with an over-current protection function to limit the output current to a predetermined level.

An example of such over-current protection function is a depending type protection function in which an output voltage versus output current characteristic for limiting the output current is initiated at a predetermined output current level. Although such depending type over-current protection function is usable, the power control transistor of the converter can be destructed by resistive heat generated if a certain constant current continues to flow through it.

A known fold-back current limiting type over-current protection circuit is capable of overcoming the above-mentioned drawback of the depending type protection function. A feature of the fold-back current limiting type over-current protection circuit is characterized in that when the output voltage begins to decrease the output current also decreases simultaneously and that the level of the output current associated with the lowest output voltage is lower than the level of the current at the beginning of the decrease. The feature will be hereinafter referred to as over-current protection scheme. Thus, the output current is restricted to a sufficiently low level by the fold-back current limiting type over-current protection scheme even if a constant current continues to flow, thereby avoiding destruction of the power transistor (see, for example, Japanese Patent Applications (JPA) Laid Open 2002-304225 and 2000-209850).

Constant voltage DC power units equipped with a fold-back current limiting over-current protection circuit are mostly constructed in the form of series power supply units as disclosed in the first reference (JPA Laid Open 2002-304225). As a consequence, although series power supply units can enjoy merits of a fold-back current limiting over-current protection circuit, they are not suitable for use in cases where high power-efficiency is required, since they inevitably suffer from a large power loss that accompanies the voltage control. A switching power supply unit having a transformer interposed between the input and output terminals of a DC power unit is also proposed in the second reference (JPA Laid Open 2000-209850), which is, however, difficult to be miniaturized because of the transformer included, and hence not suitable for use in LSIs.

SUMMARY OF THE INVENTION

It is therefore an object of the invention to provide a switching type dc-dc converter for providing a predetermined dc voltage by controlling on-off operation of a power transistor receiving an input dc voltage, the converter implementing a fold-back current limiting type over-current protection circuit that is simple in structure but capable of suppressing excessive current that would otherwise flow in the converter in the event of, for example, short-circuiting.

In accordance with one aspect of the invention, there is provided a switching type dc-dc converter, comprising:
  a switching transistor circuit;
  a smoothing circuit connected to the output end of the switching transistor circuit and adapted to provide a smoothed output voltage;
  a constant voltage control circuit for maintaining the output voltage at a constant level, the constant-voltage control circuit having
    an error amplification circuit for comparing a detection voltage associated with the output voltage with a reference voltage to output an error signal in accord with the difference between the detection voltage and reference voltage,
    an oscillation circuit for providing a comparison signal and a periodic signal each having a respective predetermined period of cycle, and
    a pulse width modulation circuit for generating a switching control signal to be supplied to the switching transistor circuit based on the comparison of the error signal and comparison signal; and
  a current restriction circuit for restricting the current that flows through the switching transistor circuit, the current restriction circuit having
    a current detection circuit for detecting the level of the current flowing through the switching transistor circuit and providing the detected current level;
    a reference current level setting circuit for setting a reference current level such that the reference current level decreases with the output voltage;
    a comparison circuit for providing an over-current detection signal when the detected current level exceeds the level of the reference current, and
    a switching control signal stopping circuit for stopping the switching control signal to the switching transistor circuit in response to the over-current detection signal and for reviving the switching control signal in response to the periodic signal.

The oscillation circuit may be adapted to receive the detection voltage associated with the output voltage and output the comparison signal and periodic signal having the predetermined period of cycle when the detection voltage received is not lower than a predetermined voltage but otherwise output a comparison signal and a periodic signal each having a longer period of cycle than the predetermined period of cycle. The oscillation circuit may further include a charging-discharging capacitor that is charged to a voltage between an upper limit voltage and a lower limit voltage and alternately charges and discharges. The magnitudes of charge and discharge currents of the charging-discharging capacitor may be altered based on the comparison of the detection voltage with the predetermined voltage.

Moreover, the switching control signal stopping circuit may have a flip-flop circuit that is set by the periodic signal to provide an output signal and reset by the over-current detection signal, and a logic circuit for making a determination as to whether the switching control signal be passed to the switching transistor circuit or not in accordance with the output signal received from the flip-flop circuit.

The reference current level may be determined by the sum of a current restriction setting voltage and the detection voltage. The detected current level is determined by the product of the on-state resistance of the switching transistor circuit and the current flowing through it.

The comparison circuit is configured to output the over-current detection signal based on the comparison of the current detection signal that is obtained by subtracting the voltage representing the detected current level from a power supply voltage and a reference current setting level voltage that is obtained by subtracting the voltage representing the reference current level from the power supply voltage.

The current detection circuit is connected between the input end of the comparison circuit receiving the current detection signal and the output end of the switching transistor circuit, and has a switch that is switched on and off by the switching control signal in synchronism with the switching transistor circuit.

Thus, the switching type dc-dc converter of the invention may protectively lower the reference current level in accord with the decrease in the output voltage, and may stop the switching control signal to the switching transistor circuit when the current detection level exceeds a reference current level. The inverter may also prolong the switching period of the switching transistor circuit when the output voltage has lowered due to, for example, short-circuiting. In this manner, the converter attains a characteristic fold-back current limiting type protective scheme by protectively reducing the reference current level and extension of the switching period, thereby preventing excessive current from flowing in the converter in the event of malfunction such as short-circuiting.

In addition, since the switching control signal is stopped by an over-current detection signal but revived by the periodic signal, suppression of the current and recovery from malfunction are automatically performed.

Further, since the output current is detected by detecting the voltage across the output ends of the switching transistor circuit, no power is lost in the current detection, which adds an improvement to the efficiency of the converter. Since the current detection is in synchronism with the switching transistor circuit, current can be accurately detected.

DETAILED DESCRIPTION OF THE PREFERRED EMBODIMENT

Figure 1:
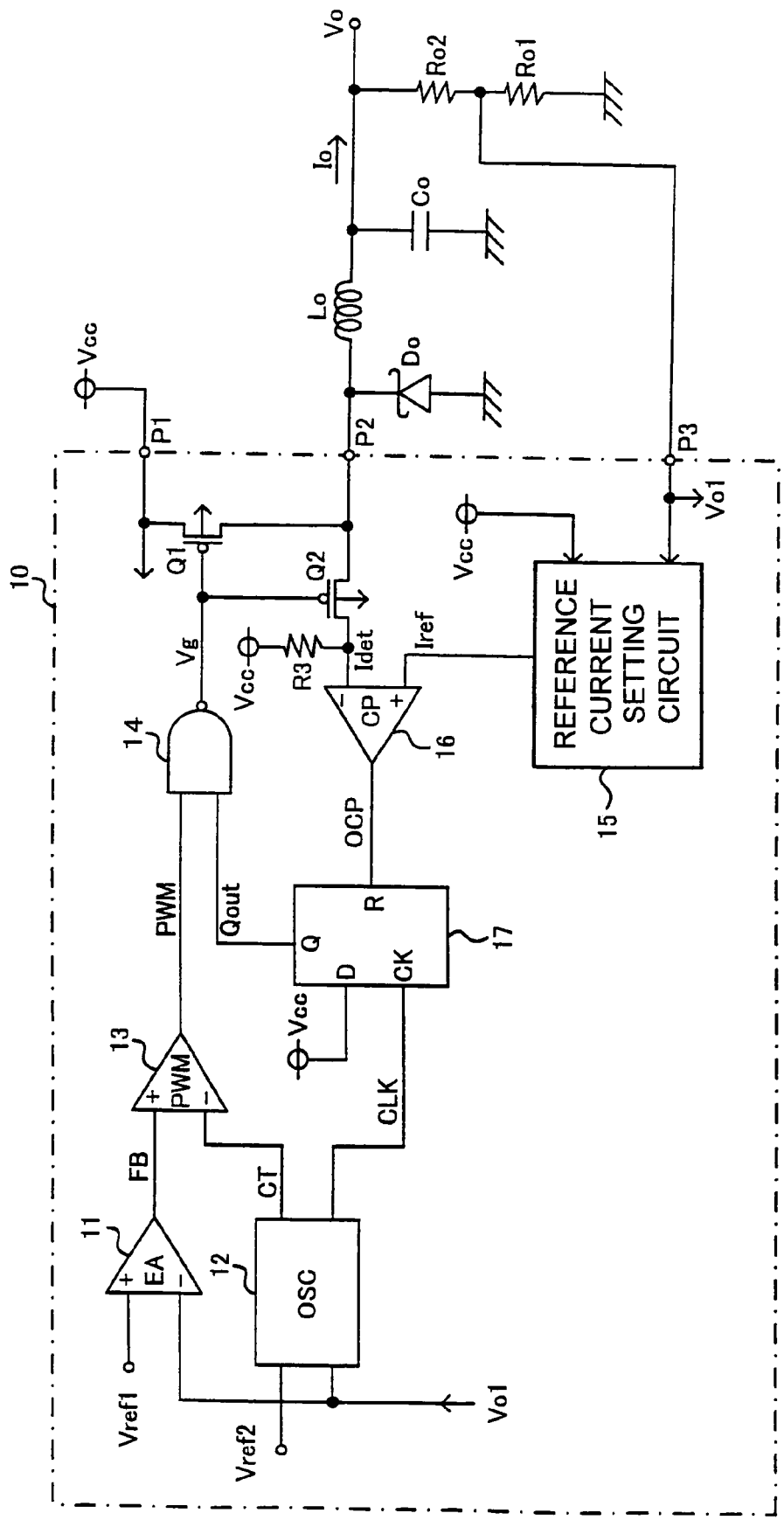
FIG. 1 shows the configuration of a switching type dc-dc converter in accordance with a first embodiment of the invention.
Figure 2:
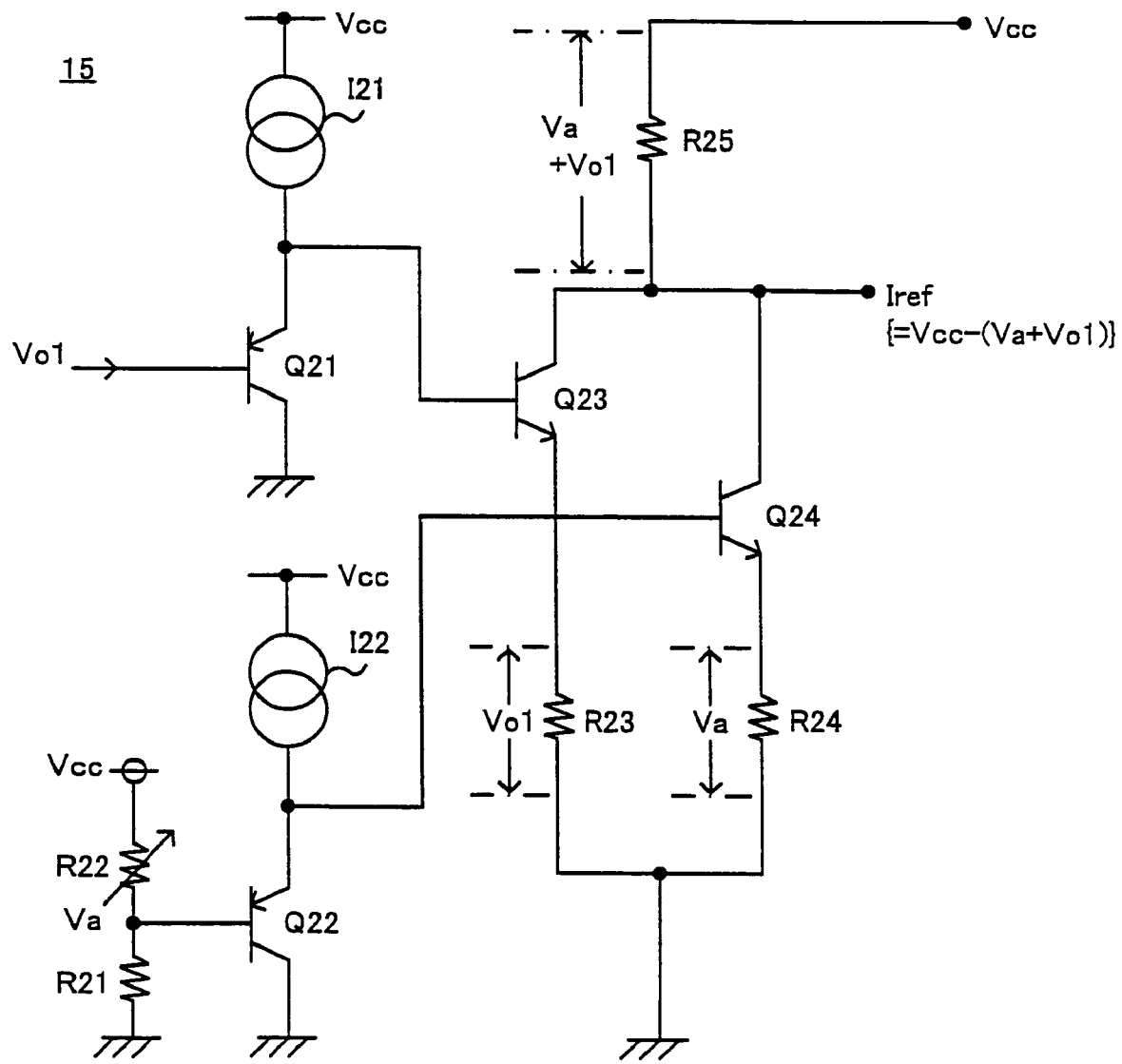
FIG. 2 shows the configuration of an exemplary reference current level setting circuit.
Figure 3:
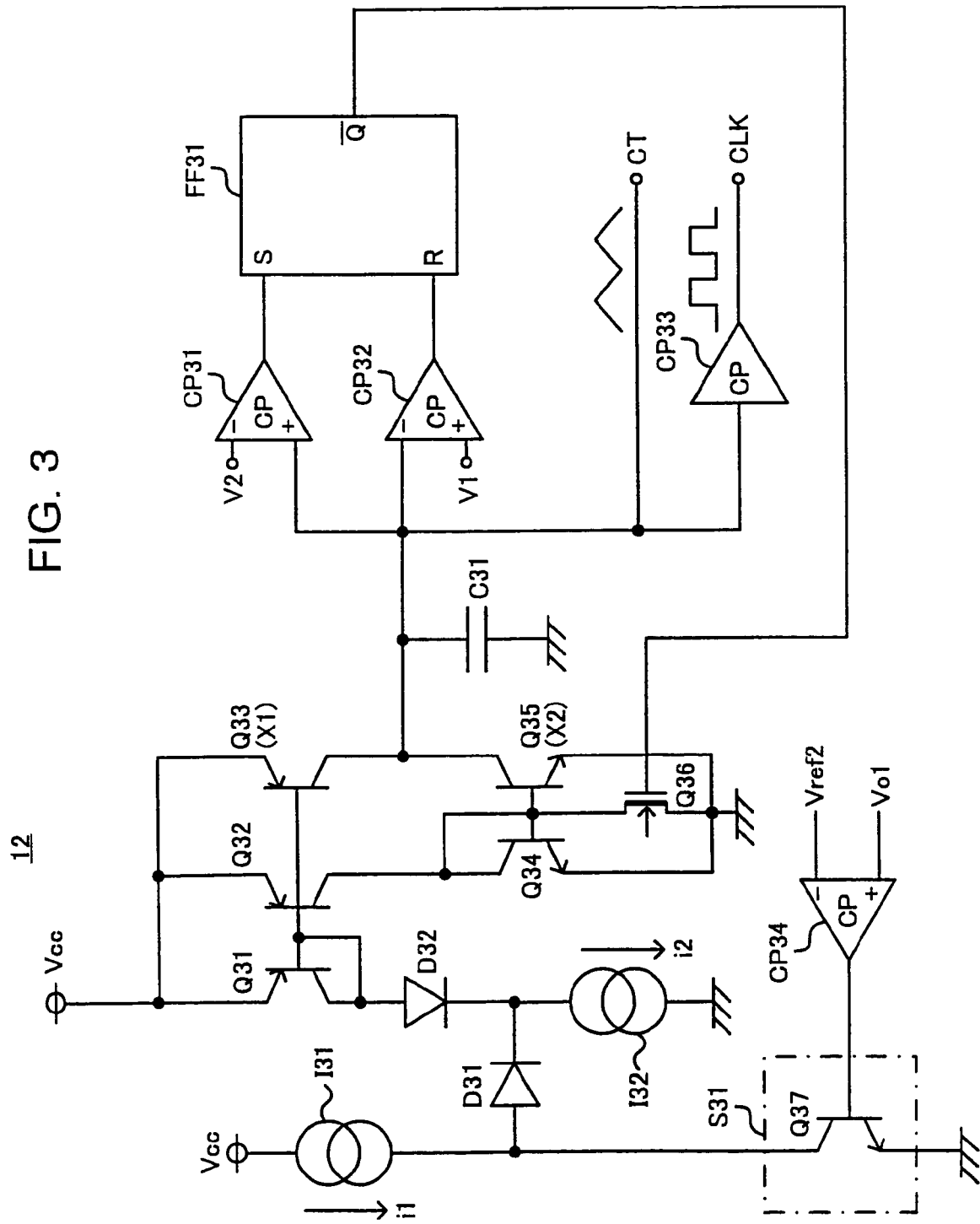
FIG. 3 shows the circuit configuration of an exemplary oscillation circuit.
Figure 4:
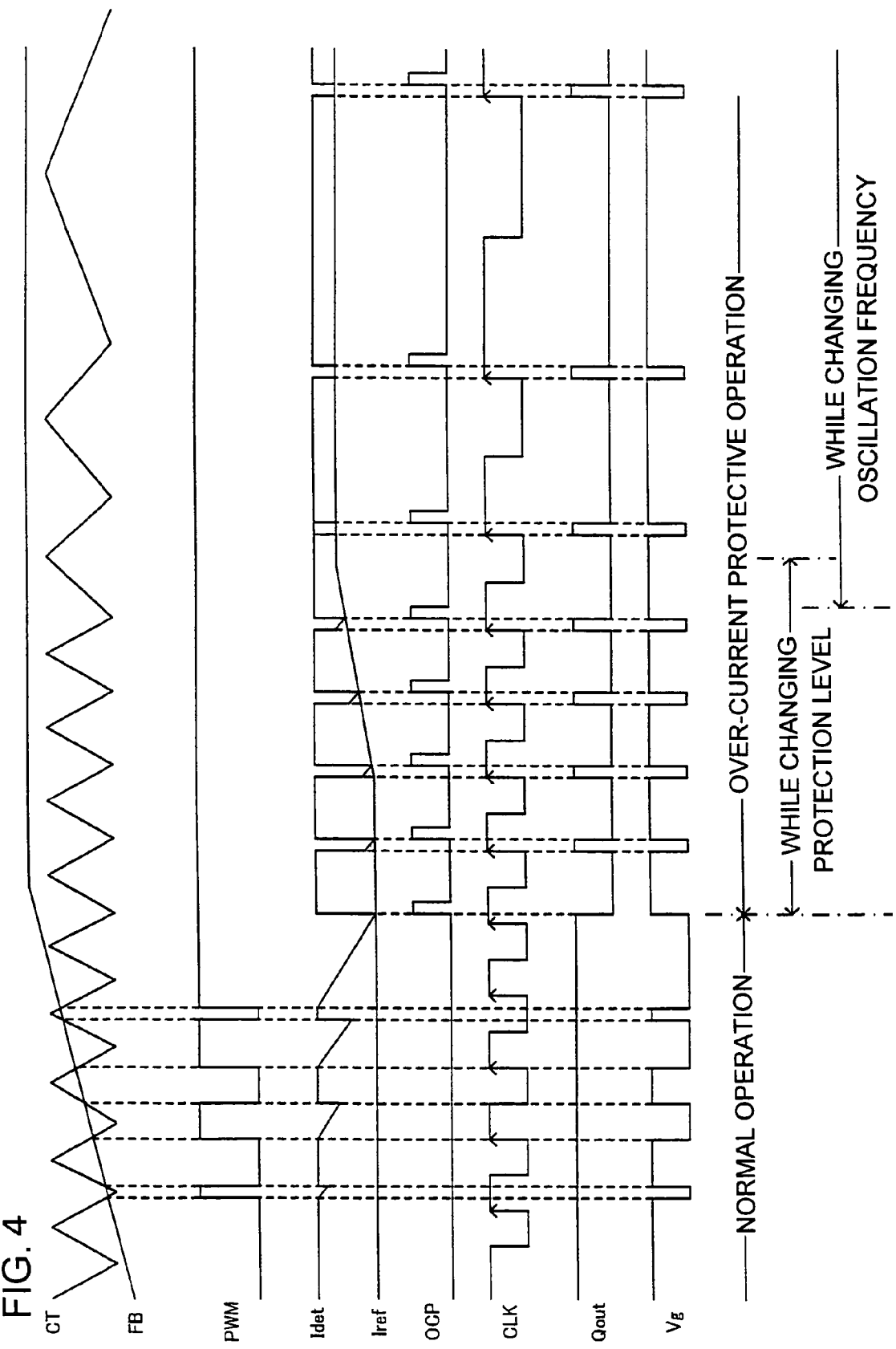
FIG. 4 is a timing diagram describing the operation of a converter of the invention.

The invention will now be described by way of example with reference to accompanying drawings. FIG. 1 is a diagram showing the structure of a switching type dc-dc converter in accordance with a first embodiment of the invention. FIG. 2 is a diagram showing a specific example of a reference current level setting circuit. FIG. 3 is a diagram showing a specific example of an oscillation circuit. FIG. 4 is a timing diagram illustrating the operation of an inventive dc-dc converter.

Referring to FIG. 1, there is shown an IC 10 having a first input terminal P1 receiving a dc power supply voltage Vcc. The inputted dc supply voltage Vcc is outputted from the second terminal P2 of the dc-dc converter when a switching transistor Q1 is turned on, but is cut off otherwise, depending on a gate control signal Vg supplied to the gate thereof. The switching transistor Q1 constituting the switching transistor circuit can be a P-type MOS transistor. In what follows, voltages represent potentials relative to the ground unless otherwise stated.

The power provided at the second terminal P2 is smoothed by a smoothing coil Lo, a smoothing capacitor Co, and a Schottky diode Do before it is supplied as an output current Io to an external load (not shown) with an output voltage Vo. The output voltage Vo is divided by voltage dividing resistors Ro1 and Ro2 into voltages of Vo1 and Vo2. The voltage Vo1 is supplied to the dc-dc converter IC 10 as a detection voltage via a third terminal P3.

In addition to the switching transistor Q1, the dc-dc converter IC 10 has a constant-voltage control circuit system that includes an error amplifier 11, an oscillation circuit 12, and a pulse width modulation circuit 13, and a current restriction circuit system that includes a reference current level setting circuit 15, a comparator 16, a D-type flip-flop circuit 17, and a current detection switch Q2.

The error amplifier 11 receives an output reference voltage Vref1 and the detection voltage Vo1, and outputs an error signal FB in accord with the difference between the two voltages received. The oscillation circuit 12 outputs a triangular wave signal CT serving as a comparative signal and another periodic signal serving as a clock signal CLK, both having the same predetermined period of cycle. This oscillation circuit 12 is supplied with a reference voltage Vref2 for altering the period of oscillation thereof (the voltage hereinafter referred to as predetermined voltage) and the detection voltage Vo1, and, when the detection voltage Vo1 becomes lower than the predetermined voltage Vref2, alters the period of the triangular wave signal CT and the clock signal CLK to a period longer than their predetermined period.

The pulse width modulation circuit 13 receives the error signal FB and the triangular wave signal CT, and outputs a switching control signal PWM having a magnitude determined on the basis of the comparison of these signals. The switching control signal PWM is converted by an NAND circuit 14 into the gate control signal Vg, which is supplied to the gate of the switching transistor Q1.

The reference current level setting circuit 15 is provided to set up a protective level of the reference current for protection against over-current (the level referred to as (protective) reference current level). To do this, the reference current level setting circuit 15 provides a reference current level setting voltage Iref, the magnitude of which is determined by subtracting the sum (reference current level: Va+Vo1) of a current restriction setting voltage Va and the detection voltage Vo1 from power supply voltage Vcc, so that Iref={Vcc−(Va+Vo1)}. The reference current level setting voltage Iref is low while the detection voltage Vo1 is large and the converter is in operation under the constant-current control by the constant-current circuit system. On the other hand, when operating under the over-current protection operation, the reference current level setting voltage Iref is high, since the detection voltage Vo1 is then low.

The current restriction setting voltage Va is the associated with the current that corresponds to the minimum output voltage Vo based on the over-current protection scheme.

The current detection switch Q2 is a P-type MOS transistor, which is connected between the drain of the switching transistor Q1 (or the second terminal P2) and an input terminal of the comparator 16. Since the current detection switch Q2 is supplied at the gate thereof with the gate control signal Vg, it is turned on and off simultaneously with the switching transistor Q1. A resistor R3 is a pull-up resistor, adapted to pull up the voltage of one input terminal of the comparator 16 to the power supply voltage Vcc when the current detection switch Q2 is turned off.

The drain voltage of the switching transistor Q1 is reduced to the voltage Vcc−Ron×I, where Ron is the on-state resistance of the switching transistor Q1, and I the current flowing through the transistor Q1. This drain voltage serves as the current detection signal Idet. Since the on-state resistance Ron can be regarded constant, the drain voltage of the switching transistor Q1 can be said to represent the current flowing through it. Use of such current detection technique permits us to eliminate a current detection resistor, thereby reducing the electric power loss by the resistor. The current detection switch Q2 and pull-up resistor R3 together constitute current detection means.

The comparator 16 is provided at its (+)-input terminal with the reference current level setting voltage Iref and at the (−)-input terminal with the current detection signal Idet. Under normal operations, the current detection signal Idet is larger than the reference current level setting voltage Iref that comparator 16 does not generate an over-current detection signal OCP. If, however, the current detection signal Idet becomes smaller than the reference current level setting voltage Iref under an over-current condition, the comparator 16 will generate an over-current detection signal OCP.

Together with the NAND circuit 14, a D-type flip-flop circuit (referred to as D-FF) 17 constitutes means for stopping the switching control signal (switching control signal prevention means). The D-FF 17 reads the power supply voltage Vcc inputted to the data terminal D thereof, at the rise of the clock signal CLK inputted to the clock terminal CK, and generates an output signal Qout at the output terminal Q thereof. The reset terminal R of the D-FF 17 is connected to the output terminal of the comparator 16, so that the D-FF 17 will be reset to terminate the output signal Qout when an over-current detection signal OCP is generated.

Thus, the output signal Qout is outputted in succession under normal operating conditions. The output signal Qout terminated by the over-current detection signal OCP is regenerated at a rise of the clock signal CLK. It is noted that the D-FF 17 may be replaced by a flip-flop of another configuration such as a set-reset type flip-flop (referred to as R-S type FF).

FIG. 2 shows an exemplary configuration of the reference current level setting circuit 15. As seen in FIG. 2, connected in series between the power supply voltage Vcc and the ground are a constant-current source I21 and a PNP-type bipolar transistor (referred to as PNP transistor) Q21 having a base coupled with the detection voltage Vo1. In addition, connected in series between the power supply voltage Vcc and the ground are a constant-current source I22 and a PNP transistor Q22 having a base coupled with the current restriction setting voltage Va. The current restriction setting voltage Va is obtained by dividing the power supply voltage Vcc by voltage dividing resistors R21 and R22. The voltage Va can be varied by the resistor R22.

The series circuit consisting of an NPN-type bipolar transistor (referred to as NPN transistor) Q23 and a resistor R23 and the series circuit consisting of an NPN transistor Q24 and a resistor R24 are connected in parallel. A resistor R25 is connected in series with this parallel circuit, between the power supply voltage Vcc and the ground. The base of the NPN transistor Q23 is connected to the emitter of the PNP transistor Q21, while the base of the NPN transistor Q24 is connected to the emitter of the PNP transistor Q22.

The transistors Q21–Q24 can be regarded as having the same base-emitter voltage (i.e. voltage across the base and emitter) Vbe. Then, the voltage Vo1 is generated across the resistor R23, while the voltage Va across the resistor R24. If the resistances of the resistors R23, R24, and R25 are chosen to be the same, the potential drop by the resistor R25 will be Va+Vo1. Therefore, the reference current level setting voltage Iref outputted from the collector of the NPN transistor Q23 equals Vcc−(Va+Vo1).

FIG. 3 shows an exemplary circuit configuration of an oscillation circuit 12. As shown in FIG. 3, a constant-current source I31 (providing current i1) and a switch circuit S31 having an NPN transistor Q37 are connected in series between the power supply voltage Vcc and the ground. A comparator CP34 receiving at (+)-input terminal thereof the detection voltage Vo1 and receiving at (−)-input terminal thereof the predetermined voltage Vref2 supplies the output thereof to the base of the NPN transistor Q37. The predetermined voltage Vref2 is preferably lower than the reference voltage Vref1 (for example, Vref2 being about 60% of Vref1).

Under normal operating conditions, the switch circuit S31 is turned on to flow current i1 through it. As the converter falls into an over-current condition, the detection voltage Vo1 lowers, thereby turning off the switch circuit S31. In order to avoid a rapid change in the current that follows such switching, the switch circuit S31 is configured to slowly vary the level of the current flowing through it from i1 to zero when switched off, and from zero to i1 when switched on.

Connected in series between the power supply voltage Vcc and the ground are a PNP transistor Q31 having a base and a collector connected together, a diode D32, and a constant-current source I32 (providing a current of level i2). The current level i2 is set larger than the current level i1 (i2>i1). A diode D31 is connected between the node of the constant-current source I31 and the switch circuit S31 and the node of the diode D32 and the constant-current source I32 to allow current to flow in the direction to the constant-current source I32.

PNP transistors Q32 and Q33 are provided to form a current mirror circuit mirroring the current flowing through the PNP transistor Q31. The current mirror ratio of the mirror circuit can be set arbitrary. For simplicity of description, however, the current mirror ratio is assumed to be 1 unless otherwise stated. An NPN transistor Q34 having a collector and a base connected together is connected in series with the PNP transistor Q32. An NPN transistor Q35 is connected in series with the PNP transistor Q33. This NPN transistor Q35 is chosen so that it forms, together with the NPN transistor Q34, a current mirror circuit having a current mirror ratio of 2. The base and emitter of each of the transistors Q34 and Q35 are connected together. The PNP transistor Q33 and NPN transistor Q35 are chosen so that the ratio of the current flowing through the PNP transistor Q33 to that of NPN transistor Q35 is 1 to 2. Connected between the base and the emitter of the NPN transistor Q34 is an N-type MOS transistor (referred to as N-type transistor) Q36, which is supplied at the gate thereof with a switching signal. Hence, a current flows through the NPN transistor Q35 that is double the current flowing through the PNP transistor Q33 or zero depending on the switching signal received.

Connected at the node of the PNP transistor Q33 and NPN transistor Q35 is a capacitor C31 for generating thereacross a voltage (referred to as capacitor voltage) that varies between an upper limit (voltage V2) and a lower limit (voltage V1). The upper limit voltage is fed to the (+)-input terminal of the comparator CP31, while the lower limit voltage is fed to the (−)-input terminal of the comparator CP32. The comparator CP31 is fed the upper limit and lower limit voltages V2 and V1, respectively, at the (+)-input terminal and (−)-input terminal thereof, respectively.

The output of the comparator CP31 is supplied to the set input terminal S of an R-S type flip-flop circuit FF31, while the output of comparator CP32 is supplied to the reset input terminal R of the R-S FF31. The output from the inverted output terminal of the R-S FF31 is supplied to the gate of an N-type transistor Q36 as a switching signal thereto.

The capacitor voltage of the capacitor C31 is provided as the triangular wave signal CT. On the other hand, the capacitor voltage of the capacitor C31 is fed to a comparator CP33 where it is reshaped into a rectangular clock signal CLK synchronized with the triangular wave signal CT.

In the oscillation circuit 12 shown in FIG. 3, the switch circuit S31 is turned on under normal operating conditions, thereby allowing the current i1 to flow through it. Hence, the current i2 from the current source I32 entirely flows through the PNP transistor Q31. Under this operating condition, the circuit formed of the transistors Q32–Q36 and the capacitor C31 (referred to as charging-discharging circuit) undergoes charging-discharging operation supported by the current i2.

As seen in FIG. 3, the capacitor C31 is charged by the current i2 when the NPN transistor Q35 is turned off. As the voltage across the capacitor C31 rises to the upper limit voltage V2, the R-S type flip-flop circuit FF31 is set to turn on the NPN transistor Q35. This causes the capacitor C31 to be discharged by the current i2, which in turn causes the voltage across the capacitor C31 to lower to the lower limit voltage V1, resetting the flip-flop circuit FF31 and turning off the NPN transistor Q35 again. Charging and discharging of the capacitor C31 by the current i2 is repeated, generating the triangular wave signal CT and the clock signal CLK having a predetermined period of cycle.

On the other hand, should an over-current condition take place, the detection voltage Vo1 lowers from the predetermined voltage Vref2, causing the switch circuit S31 to be turned off. This in turn causes the current i1 from the constant-current source I31 to merge into the current i2 from the constant-current source I32. As a consequence, the current flowing through the PNP transistor Q31 decreases to (i2−i1). As a result, the capacitor C31 is charged and discharged by the reduced current (i2−i1), which makes the period of charging-discharging cycle longer than the predetermined period. The period of the cycle under over-current conditions can be prolonged to about 4 times as long as the predetermined period under normal operating conditions. In terms of frequency, if the frequency during a normal operation is 100 kHz, the frequency of the prolonged period can be 25 kHz.

In the example given above, the oscillation circuit 12 has been described to have two switchable periods of cycle, one for normal operating conditions and another for over-current protective operating conditions. As another example, the oscillation circuit 12 may have multiple steps of switchable periods that increase sequentially in association with predetermined multi-level output voltages (Vref2, Vref3, Vref4, etc.).

Operation of the switching type dc-dc converter in accordance with the first embodiment shown in FIG. 1 will now be described with reference to a timing diagram shown in FIG. 4.

Under normal operating conditions, the high level (H-level) output signal Qout is continuously provided, since no over-current detection signal OCP is generated. A switching control signal PWM, generated on the basis of comparison of the error signal FB and triangular wave signal CT, is inputted to the NAND circuit 14, which provides the gate control signal Vg for switching on and off the switching transistor Q1. A detection voltage Vo1 associated with the output voltage Vo is fed back to the reference current level setting circuit 15 to maintain the output voltage Vo at a predetermined level. In this case, the reference current level setting voltage Iref outputted from the reference current level setting circuit 15 has a low voltage of Vcc−(Va+Vo1). The triangular wave signal CT outputted from the oscillation circuit 12 has a predetermined period of cycle that corresponds to 100 kHz, for example, in normal operations.

It is noted that in the invention the output voltage Vo at the time of startup is set to 0 V, so that the reference current level setting voltage Iref has corresponding level. As a result, during startup, inrushing current can be automatically suppressed by the over-current protection scheme. Since no circuit failure such as short-circuiting has not occurred during startup, the output voltage Vo gradually rises while suppressing possible inrushing current if any. The operation subsequently assumes a normal operating condition. A similar development of operation as in the startup also takes place in the operation of the oscillation circuit 12.

As the current detection signal Idet lowers below the reference current level setting voltage Iref, the over-current protection operation comes into play. In the initial stage of the over-current protection operation, the reference current level setting voltage Iref slowly increases with the decrease of the output voltage Vo. This mode of operation will be referred to as protection-level varying mode. If the output voltage Vo further decreases to the predetermined voltage Vref2, the frequency of oscillation of the oscillation circuit 12 (which is also the frequency of the triangular wave signal CT and clock CLK) is reduced from the frequency defined for the normal operating condition to a lower frequency.

First, in an early stage of the over-current protective operation, if the current detection signal Idet becomes lower than the reference current level setting voltage Iref, the over-current detection signal OCP is generated. As a consequence, the D-FF 17 is reset to stop generating the output signal Qout, pulling down to L-level, which causes the switching control signal PWM to be stopped by the NAND circuit 14 and the gate control signal Vg to be pulled up to H-level (note that the NAND circuit 14 inverts logical states). Hence, the switching transistor Q1 is turned off. Under this condition, the output current Io flows through the diode Do and smoothing coil Lo.

At the same time, the current detection switch Q2 is also turned off, which causes the current detection signal Idet to be pulled up to H-level, stopping generation of the over-current detection signal OCP. The length of this period of generating the over-current detection signal OCP is determined by the response time of the over-current protection loop used in the over-current protection circuit.

The D-FF 17 is not immediately set after the termination of the over-current detection signal OCP. It is set when the clock signal CLK rises. As the D-FF 17 is set, the switching transistor Q1 is again turned on by the switching control signal PWM. While the over-current condition continues, the over-current detection signal OCP is generated in response to the turning on of the switching transistor Q1. The switching transistor Q1 will be turned off again.

Since only a little energy is supplied through the switching transistor Q1 during such over-current protection operation, the output voltage Vo gradually declines. As a consequence, the reference current level setting voltage Iref rises gradually. That is, the protective current level lowers with the fall of the output voltage during the over-current protection operation. As a result, in terms of the Vo-Io characteristic, a fold-back current limiting type characteristic is implemented.

Next, as the output voltage Vo decreases, gradually, below the predetermined voltage Vref2 as a result of the over-current protection operation in the protection-level varying mode, the period of cycle of the oscillation circuit 12 is switched from the predetermined normal period to a still longer period (in terms of frequency, from 100 kHz to 25 kHz for example). This switching is carried out slowly over a prolonged period of time in order to avoid a rapid change in the period of cycle.

As the period of cycle of the oscillation circuit 12 is prolonged, the on-state period of the switching transistor Q1, and hence the period of cycle of generating over-current detection signal OCP, prolongs accordingly while the over-current condition continues.

As mentioned above, since the on-state period of the switching transistor Q1 under the over-current protection operation is determined by the response time of the over-current protection loop, the period cannot be shortened less than the response time. If this response time is not short enough, it may be difficult to sufficiently reduce the output current Io even if the output voltage Vo decreases to a low voltage.

However, the period of cycle of the inventive oscillation circuit 12 is prolonged depending on the degree of decrease in the output voltage Vo. Thus, the output current Io can be sufficiently reduced by extending the period of oscillation even if the output current Io cannot be reduced solely by changing the level. In other words, the fold-back current limiting characteristic can be realized in such cases also.

Figure 5:
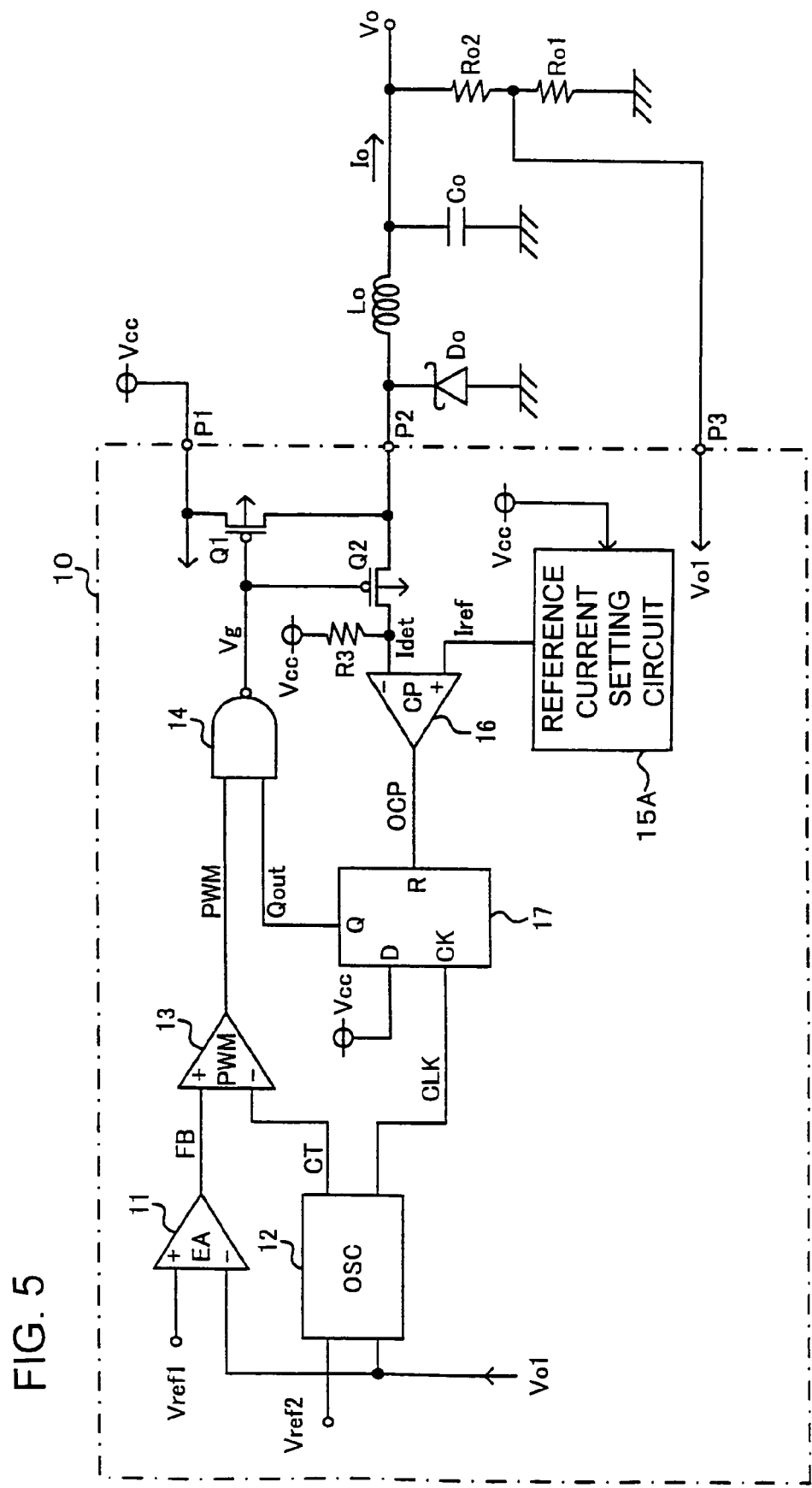
FIG. 5 shows the configuration of a switching type dc-dc converter in accordance with a second embodiment of the invention.

FIG. 5 shows a configuration of a switching type dc-dc converter in accordance with a second embodiment of the invention.

The reference current level setting circuit 15A of FIG. 5 is adapted to provide a fixed reference current level setting voltage Iref irrespective of the magnitude of the output voltage Vo. Configurations of other components are the same as those of the first embodiment shown in FIG. 1.

In this example, too, if the output voltage Vo falls down to the predetermined voltage Vref2 during an over-current protective operation, the frequency of the oscillation circuit 12 will be lowered accordingly, thereby reducing the output current Io as desired. As a result of this reduction of the oscillation frequency of the oscillation circuit 12, a characteristic fold-back current limiting scheme is attained during the over-current protective operation.

What is claimed is:

1. A switching type dc-dc converter, comprising:
   a switching transistor circuit;
   a smoothing circuit connected to the output end of said switching transistor circuit and adapted to provide a smoothed output voltage;
   a constant-voltage control circuit for maintaining said output voltage at a constant level, said constant-voltage control circuit having
   an error amplification circuit for comparing a detection voltage associated with said output voltage with a reference voltage to output an error signal in accord with the difference between said detection voltage and reference voltage,
   an oscillation circuit for providing a comparison signal and a periodic signal each having a respective predetermined period of cycle, and
   a pulse width modulation circuit for comparing said error signal and comparison signal to generate a switching control signal to be supplied to said switching transistor circuit; and
   a current restriction circuit for restricting the current that flows through Bald switching transistor circuit, said current restriction circuit having
   a current detection circuit for detecting and providing the level of current flowing through said switching transistor circuit,
   a reference current level setting circuit for setting the level (referred to as reference current level) of a reference current such that said reference current level decreases in accord with the decrease in said output voltage;
   a comparison circuit for providing an over-current detection signal when said detected current level exceeds said reference current level, and
   a switching control signal stopping circuit for stopping said switching control signal to said switching transistor circuit in response to said over-current detection signal and for reviving said switching control signal in response to said periodic signal,
   wherein said oscillation circuit is adapted to receive a detection voltage associated with said output voltage and output said comparison signal and periodic signal having said predetermined period of cycle when said detection voltage inputted is put lower than a predetermined voltage but otherwise output a comparison signal and a periodic signal each having a longer period of cycle than said predetermined period of cycle.

2. The switching type dc-dc converter according to claim 1, wherein said switching control signal stopping circuit includes
   a flip-flop circuit that is set by said periodic signal to provide an output signal and reset by said over-current detection signal, and
   a logic circuit for making a determination as to whether said switching control signal be passed to said switching transistor circuit or not in accordance with the output signal received from said flip-flop circuit.

3. The switching type dc-dc converter according to claim 1, wherein said reference current level is determined by the sum of a current restriction setting voltage and said detection voltage.

4. The switching type dc-dc converter according to claim 1, wherein said detected current level is determined by the product of the on-state resistance of said switching transistor circuit and the current flowing through said switching transistor circuit.

5. The switching type dc-dc converter according to claim 1, wherein:
   said reference current level is determined by the sum of a current restriction setting voltage and said detection voltage, and
   said detected current level is determined by the product of the on-state resistance of said switching transistor circuit and the current flowing through said switching transistor circuit.

6. The switching type dc-dc converter according to claim 1, wherein said comparison circuit is configured to output said over-current detection signal based on the comparison of the current detection signal that is obtained by subtracting the voltage representing said detected current level from a power supply voltage and a reference current setting level voltage that is obtained by subtracting the voltage representing said reference current level from said power supply voltage.

7. The switching type dc-dc converter according to claim 6, wherein said current detection circuit is connected between the input end of said comparison circuit receiving said current detection signal and said output end of said switching transistor circuit, and has a switch that is switched on and off by said switching control signal in synchronism with said switching transistor circuit.

8. The switching type dc-dc converter according to claim 1, wherein:
said oscillation circuit has a charging-discharging capacitor that is charged to a voltage between an upper limit and a lower limit and alternately charges and discharges, and wherein
the magnitudes of charge and discharge currents of said charging-discharging capacitor are switched based on the comparison of said detection voltage and said predetermined voltage.

9. The switching type dc-dc converter according to claim 1, wherein said switching control signal stopping circuit has
a flip-flop circuit that is set by said periodic signal to provide an output signal and reset by said over-current detection signal; and
a logic circuit for making a determination as to whether said switching control signal be passed to said switching transistor circuit or not in accordance with the output signal received from said flip-flop circuit.

10. The switching type dc-dc converter according to claim 1, wherein
said reference current level is determined by the sum of a current restriction setting voltage and said detection voltage, and
said detected current level is determined by the product of the on-state resistance of said switching transistor circuit and the current flowing through it.

11. The switching type dc-dc converter according to claim 1, wherein said comparison circuit is configured to output said over-current detection signal based on the comparison of the current detection signal that is obtained by subtracting the voltage representing said detected current level from a power supply voltage and a reference current setting level voltage that is obtained by subtracting the voltage representing said reference current level from said power supply voltage.

12. The switching type dc-dc converter according to claim 11, wherein said current detection circuit is connected between the input end of said comparison circuit receiving said current detection signal and said output end of said switching transistor circuit, and has a switch that is switched on and off by said switching control signal in synchronism with said switching transistor circuit.

13. A switching type dc-dc converter, comprising:
a switching transistor circuit;
a smoothing circuit connected to said output end of said switching transistor circuit and adapted to output a smoothed output voltage;
a constant-voltage control circuit for maintaining said output voltage at a constant level, said constant-voltage control circuit having
an error amplification circuit for comparing a detection voltage associated with said output voltage with a reference voltage to output an error signal in accord with the difference between said detection voltage and reference voltage,
an oscillation circuit adapted to receive a detection voltage associated with said output voltage and output a comparison signal and a periodic signal having a predetermined period of cycle when said detection voltage inputted is not lower than a predetermined voltage but otherwise output a comparison signal and a periodic signal each having a longer period of cycle than said predetermined period of cycle,
a pulse width modulation circuit for comparing said error signal and comparison signal to generate a switching control signal to be supplied to said switching transistor circuit; and
a current restriction circuit for restricting the current that flows through said switching transistor circuit, said current restriction circuit having
a current detection circuit for detecting and providing the level of said current flowing through said switching transistor circuit,
a reference current level setting circuit for setting the protective level of reference current (referred to as protective reference current level),
a comparison circuit for providing an over-current detection signal when said current detection level exceeds said reference current level, and
a switching control signal stopping circuit for stopping said switching control signal to said switching transistor circuit in response to said over-current detection signal and for reviving said switching control signal in response to said periodic signal.

14. The switching type dc-dc converter according to claim 13, wherein said oscillation circuit has a charging-discharging capacitor that is charged to a voltage between an upper limit and a lower limit and alternately charges and discharges; and
the magnitudes of charge and discharge currents of said charging-discharging capacitor are switched based on the comparison of said detection voltage and said predetermined voltage.

15. The switching type dc-dc converter according to claim 13, wherein said switching control signal stopping circuit has
a flip-flop circuit that is set by said periodic signal to output an output signal and reset by said over-current detection signal; and
a logic circuit for making a determination as to whether said switching control signal be passed to said switching transistor circuit or not in accordance with the output signal received from said flip-flop circuit.

16. The switching type dc-dc converter according to claim 13, wherein:
said reference current level is determined by a current restriction setting voltage; and
said detected current level is determined by the product of the on-state resistance of said switching transistor circuit and the current flowing through it.

17. The switching type dc-dc converter according to claim 13, wherein said comparison circuit is configured to output said over-current detection signal based on the comparison of the current detection signal that is obtained by subtracting the voltage representing said detected current level from a power supply voltage and a reference current setting level voltage that is obtained by subtracting the voltage representing said reference current level from said power supply voltage.

18. The switching type dc-dc converter according to claim 17, wherein said current detection circuit is connected between the input end of said comparison circuit receiving said current detection signal and said output end of said switching transistor circuit, and has a switch that is switched on and off by said switching control signal in synchronism with said switching transistor circuit.

* * * * *